US008021090B1

(12) United States Patent
Kochanowicz

(10) Patent No.: US 8,021,090 B1
(45) Date of Patent: Sep. 20, 2011

(54) ROCKER SLIDE LIFT ADJUSTMENT MECHANISM

(76) Inventor: Thomas Joseph Kochanowicz, Omaha, NE (US)

( * ) Notice: Subject to any disclaimer, the term of this patent is extended or adjusted under 35 U.S.C. 154(b) by 222 days.

(21) Appl. No.: 12/509,417

(22) Filed: Jul. 24, 2009

(51) Int. Cl.
*B23C 1/20* (2006.01)
*B23C 1/06* (2006.01)
*B27C 5/02* (2006.01)
*B23Q 3/18* (2006.01)
*B23Q 5/22* (2006.01)

(52) U.S. Cl. ..... 409/210; 409/229; 409/206; 144/135.2; 144/286.5; 81/177.6; 81/125; 81/124.2

(58) Field of Classification Search .................. 409/182, 409/181, 229, 206, 210, 214, 218, 185; 144/136.95, 144/154.5, 286.1, 286.5, 135.2; 81/53.12, 81/177.6, 64, 125, 124.2
See application file for complete search history.

(56) References Cited

U.S. PATENT DOCUMENTS 4,338,052 A * 7/1982 Lockett ......................... 409/206
5,139,061 A * 8/1992 Neilson ......................... 409/182
5,572,913 A * 11/1996 Nasiell ......................... 81/177.6
5,590,989 A 1/1997 Mulvihill
6,948,892 B2 * 9/2005 Hummel ....................... 409/182
7,052,218 B2 * 5/2006 Mussel ......................... 409/182
7,334,614 B2 * 2/2008 Cooper et al. ........... 144/136.95
7,588,400 B2 * 9/2009 Taylor ........................... 409/182
7,810,530 B2 * 10/2010 Hummel ....................... 409/206
2003/0223835 A1 12/2003 Hummel
2005/0163580 A1 7/2005 Mussel
2006/0102248 A1 5/2006 Cooper et al.

OTHER PUBLICATIONS

Nixon, John W., Motorized Router Lift, Feb. 21 & 22, 2009, East Lake Woodworking (Internet Site), http://www.eaglelakewoodworking.com/post/Motorized-Router-Lift.aspx.*

* cited by examiner

*Primary Examiner* — Erica E Cadugan

(57) ABSTRACT

A router lift adjustment mechanism for an inverted router (50, 52) mounted to a router table (92) comprising an assortment of attachments (98*a*, 98*b*, 98*c*, 98*d*) that engage the height adjustment mechanism of various types routers. The routers height adjustment mechanism, the attachment (98), a flexible attachment holder (100), a driving shaft (104), and a rotatable adjustment mechanism, typically a hand wheel (122) are contiguously coupled respectfully. The driving shaft is retained by a rocker drive guide (112) providing the driving shaft (104) the ability to rotate and slide to and fro within the bore of a bushing (114) lined rocker drive guide (112). Additionally, the rocker drive guide (112) hinges pivotably on the base mount (128) which is typically mounted to a stable surface. The rotatability, pivotability and slideability of the driving shaft (104) and rocker drive guide (112) assembly prevent any binding of the driving shaft (104) upon movement of the router adjustment mechanism; thus providing a quick, safe and stable method for adjusting the depth of a router bit (90). The present embodiment can be retrofitted to a wide variety of existing routers, adjustment apparatuses that move spirally or provided as a feature of a newly manufactured router.

16 Claims, 11 Drawing Sheets

Rocker Slide Lift for Displacing the Depth of a Router Bit and Utilizing a Moveable Pointer Pointing to Indicia of the Driving Shaft

Fig. 13

ROCKER SLIDE LIFT ADJUSTMENT MECHANISM

CROSS-REFERENCE TO RELATED APPLICATIONS

None

FEDERALLY SPONSORED RESEARCH

None

SEQUENCE LISTING

None

BACKGROUND

1. Field

This application generally relates to rotational adjustments and particularly to a depth adjustment mechanism for a power tool, such as a router, planer, and the like.

2. Prior Art

This application relates generally to an adjustment mechanism for power tools and, more particularly, to an improved lift mechanism for adjusting the depth of a router mounted under a router table in an inverted position. This improved lift mechanism makes it easier to adjust the position of plunge and fixed based routers relative to the work supporting surface commonly known as a router table.

It is well known routers are popular power tools used by woodworkers. There are two main varieties of routers, fixed based routers and plunge routers. The embodiment functions equally and similarly on both types of routers. The functionally will be described on a plunge router. A plunge router primarily consists of a motor mounted in a housing which drives a central shaft that engages a cutting bit. Many different types of cutting bits may be mounted to the central shaft and used for cutting different profiles in wood. A typical plunge router has a base mounted to it and is spaced apart from the router housing by one or more plunger rods fitted within recesses of the router housing. The distance between the housing and base are adjustable as the plunger rods act in a telescoping manor permitting the router housing and its cutting bit to slide along the plunge rods toward the base so that the cutting bit is brought into contact with the wood the base sits on. The base has a hole through which the cutting bit protrudes below the base into the wood being cut. The depth of the cut is set by adjusting the distance between the base and the router housing. Once the depth is set the woodworker drags the router across or into the wood to be cut.

To set the desired depth of the cut, a typical plunge router is equipped with a long, threaded adjustment rod which projects from the router base and through a portion of the router housing. To adjust the cutting depth, a woodworker rotates a nut along the threaded rod to set the depth of the cut the cutting bit makes. This adjustment is typically done with a wrench or a knob which engages the nut. These adjustments are easily done when the plunge router is used as a handheld tool.

Plunge routers have become popular with woodworkers that invert their plunge router, mounting them to the underside of a router table. This eliminates the need for the woodworker to handhold the router. The woodworker then feeds the material to be routed along the router table into the cutting bit. When so mounted it becomes awkward and time consuming to adjust the router bit depth from under the table.

One effort to reduce the difficulty of such adjustment contemplates the use of a flexible sleeve enclosing a threaded insert to which different driving socket mechanisms can be engaged, U.S. Pat. No. 5,590,989 to Mulvihill (1997) Flexible Router Height-Adjustment Mechanism. The threaded sleeve engages the threaded adjustment rod. While this arrangement my decrease the awkwardness and difficulty of adjusting the router bit height relative to the router table, the mechanism does not have a mounting mechanism which can stabilize the adjustment drive method. Furthermore this method relies on a socket member having a socket opening to provide the driving purpose. Additionally the method is limited to plunge routers. Furthermore the same results can be attained with common mechanic tools, combining a socket with a flexible extension bit holder attached to a socket driver at a much lower cost. Additionally, the mechanism is structurally complex and expensive to manufacture and still requires additional socket driver attachments to be useful.

Another effort to reduce the difficulty of table mounted plunge router adjustment requires a special table plate attached to the top of the router table and a separate hand crank to perform adjustments, U.S. Pat. No. 6,948,892 B2 to Hummel (2005) Lift Mechanism for Plunge Routers. While this method is effective, it is not always a simple modification to router tables that have solid surfaces, such as those made out of cast iron. Additionally before the router table can be used, a hand crank has to be removed after each adjustment. Furthermore the engagement mechanism which receives the hand crank risks being clogged with saw dust between adjustments. Furthermore a hand crank can be easily misplaced within small wood parts and sawdust expelled by the router. Furthermore this mechanism can be dangerous because it requires the woodworker to be relatively close to the cutting bit to perform any adjustments from the top of the router table.

Another effort to reduce the difficulty of table mounted plunge router adjustment requires a major retrofit of a plunge router and is limited to only plunge routers, U.S. Pat. No. 7,052,218 to Christopher John Mussel (2006) Methods and apparatus for adjusting a plunge router. Furthermore the adjustment mechanism requires a cable to raise and lower a router which provides less stability and rigidity as compared to threaded adjustment mechanisms.

Another effort to reduce the difficulty of adjusting a non plunge router, U.S. Pat. No. 7,334,614 to Randy G. Cooper, Mark A. Etter, Greg K. Griffin, Ginger L. Allen, and Derrick Kilbourne of BLACK & DECKER INC. attempts to use a worm drive to adjust the height of the router. While effective, when mounted inverted to a router table, the design depends on an adjustment using a tool above the router table. Furthermore the router is a candidate for a retrofit for the present embodiment thereby enabling the router to be adjusted below the table, attaching to the routers rotating member. Furthermore, as with the previous mentioned U.S. Pat. No. 6,948,892 B2 to Hummel (2005) Lift Mechanism for Plunge Routers, the engagement mechanism which receives the tool risks being clogged with saw dust between adjustments. Furthermore a tool can be easily misplaced within small wood parts and sawdust expelled by the router. Furthermore this mechanism can be dangerous because it requires the woodworker to be relatively close to the cutting bit to perform any adjustments from the top of the router table.

In conclusion, insofar as I am aware, no router adjustment mechanism for a table mounted router formerly developed provides the advantages of retrofitting a router to a router table as this present embodiment. These advantages include but are not limited to:

(a) safety, no reaching under router table to make adjustments to power tool;
(b) no special plate needed for router table;
(c) works with plunge and fixed based routers
(d) no permanent modification to router;
(e) familiar adjustment mechanism for woodworkers, similar to adjusting a woodworkers table saw;
(f) permanent mount, no fumbling for attachment to make an adjustment;
(g) works with less complex and costly fixed based routers;
(h) adaptable to rotatable adjustments that move spirally.

SUMMARY

A lift mechanism according to the embodiment comprises a hand wheel attached to one end of a straight shaft, within easy reach of the woodworker. The opposing end of the shaft is inserted through the rocker drive guide. The rocker drive guide is lined with a bushing(s) that allows the shaft to rotate and slide back and forth relative to the bushing. Additionally the rocker drive guide pivots on a base mount allowing a rocking or "teeter-totter" motion relative to the stationary base mount. The base mount is mounted to a convenient location on the router table. The opposing shaft end is coupled to the lower end of a flexible extension attachment holder. The upper end of the flexible extension attachment holder is coupled to the lower end of an attachment that attaches to and adjusts the depth of the router relative to the router table. The flexible extension attachment holder allows the base mount to be mounted at various convenient angles relative to the position of the router. A threaded attachment engages the threaded stop rod of the router causing the threaded attachments' end to make contact with the abutment of the router. Movement of the abutment by threading the threaded attachment clockwise or counter-clockwise adjusts the depth of cut a router bit will make relative to the router table. For safety, the shafts stop collar attached between the drive-guide and the lower end of the extension bit coupler prevents the worker from disengaging the threaded attachment from the threaded stop rod.

Accordingly it will be appreciated that a lift mechanism according to the embodiment comprises a minimum number of component parts which are structurally interrelated in a manner which makes the operation thereof and thus the desired adjustment of a router relative to router table extremely efficient and easy to achieve while, at the same time, providing for incremental adjustment and the ability to optimize accuracy with respect to a given adjustment.

It is accordingly an outstanding object of the present embodiment to provide an improved lift mechanism for adjusting the depth of a router bit relative to a router table beneath which the router is mounted.

Another object is the provision of a lift mechanism of the foregoing character which is operable from a permanently mounted position from all sides of a router table.

A further object is the provision of a lift mechanism of the foregoing character which is structurally simple, easy to operate, efficient in operation and incrementally adjustable with accuracy.

Yet another object is the provision of a lift mechanism of the foregoing character by which the mechanism is easily adaptable to rotatable adjustment mechanisms that move spirally.

DRAWINGS

The foregoing objects, and others, will in part be obvious and in part pointed out more fully hereinafter in conjunction with the written description of embodiments illustrated in the accompanying drawings in which:

FIG. 13 is a schematic view illustrating a rocker slide lift for displacing the depth of a router bit and utilizing a moveable pointer pointing to indicia of the driving shaft.

REFERENCE NUMERALS

| | |
|---|---|
| 20 | housing |
| 21 | power cord |
| 22 | bit chuck |
| 24 | base |
| 26 | support guide rods |
| 27 | adjustment dial |
| 28 | sub-base component |
| 30 | threaded fasteners |
| 32 | handles |
| 36 | threaded stop rod |
| 36a | upper end threaded stop rod |
| 36b | lower end threaded stop rod |
| 38 | abutment member |
| 40 | lock nuts |
| 42 | plunge lock lever |
| 50 | fixed base router |
| 52 | plunge router |
| 84 | router table top |
| 86 | router table fence |
| 88 | router table opening |
| 90 | router bit |
| 92 | router table |
| 97 | hose clamp |
| 98a | hex attachment |
| 98b | cup attachment |
| 98c | crimp attachment |
| 98d | threaded attachment |
| 100 | flexible extension attachment holder |
| 102 | flexible extension coupler |
| 104 | driving shaft |
| 104b | driving shaft shoulder |
| 104c | driving shaft hole |

-continued

| | |
|---|---|
| 105 | spring pin |
| 105b | spring pin hole |
| 106 | stop collar |
| 108 | table mounting bracket |
| 110 | attachment coupler |
| 110a | attachment coupler hole |
| 110b | crimp |
| 110c | spiral spring |
| 112 | rocker drive guide |
| 112a | rocker drive pivot hole |
| 114 | bushing |
| 116 | pivot retainer pin |
| 120 | base mount hole |
| 120a | mounting screws |
| 122 | hand wheel |
| 122a | hand wheel hole |
| 124 | hand wheel handle |
| 126 | set screw |
| 127 | stop screw |
| 128 | base mount |
| 128b | base mount pivot hole |
| 130 | indicia |
| 132 | pointer |
| 150 | router table shelf |
| 152 | valve |
| 154 | valve handle |
| 156 | toggle switch |
| 158 | motor |

DETAILED DESCRIPTION

Figure 1:
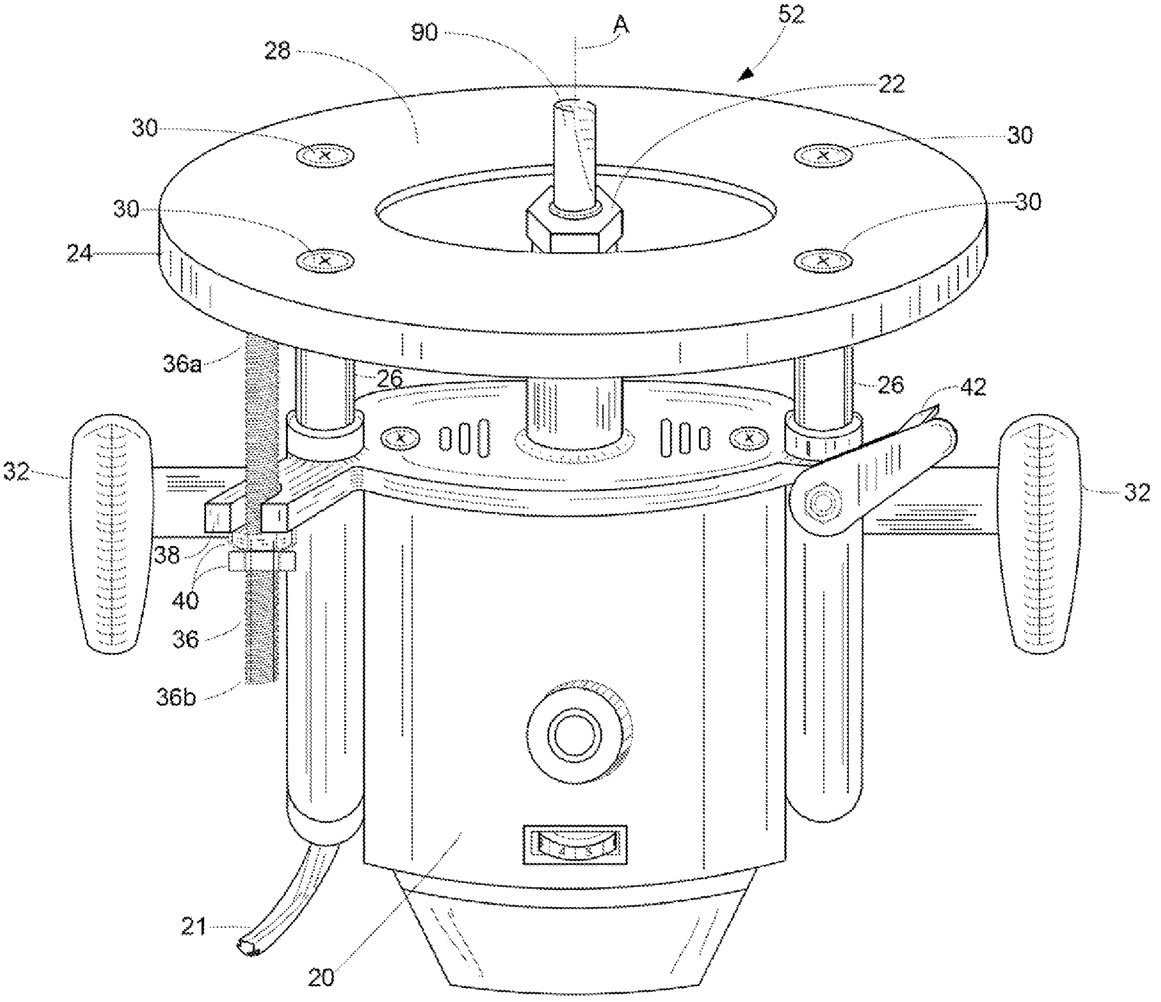
Prior Art Fig 1
FIG. 1 is a perspective view of a plunge router of the character to be provided with a lift mechanism in accordance with the present embodiment.

Referring now in greater detail to the drawings, wherein the showings are for the purpose of illustrating an embodiment only, and not for the purpose of limiting the embodiment, FIG. 1 of the drawing illustrates a Hitachi Model M12V plunge router 52 and is shown only to provide an example of the type of router to which the present embodiment is applicable. As is well known, routers of the character shown in FIG. 1 are electric motor driven and include a housing 20 enclosing the electric motor which has a power cord 21 and an output shaft provided with a router bit chuck 22 for removably mounting a desired router bit on the router for rotation about the router axis A. The router further includes a base 24 mounted on the axially outer ends of a pair of support and guide rods 26 which are axially slidably received in bores provided therefore in the housing 20, whereby the base 24 is axially displaceable toward and away from housing 20. While not shown, it is well known that springs are interposed between rods 26 and the bores therefore to bias the base 24 axially outwardly of housing 20. Base 24 generally includes a sub-base component 28 in the form of a smooth plastic disk attached to the base 24 by a plurality of threaded fasteners 30. The sub-base component 28 provides a smooth surface for engaging with a piece of wood to be routed.

Generally, routers are hand operated and, for this purpose, housing 20 is provided with a pair of diametrically opposed handles 32. It will be appreciated that FIG. 1 illustrates the router in an inverted position with respect to the position in which it would be during a hand routing operation. As is well known in connection with the latter, the position of base 24 relative to housing 20, and thus the plunge depth of a router bit relative to work being routed, is adapted to be adjusted through the use of a threaded stop rod 36 which, in the router illustrated, includes a threaded stop rod 36, an abutment member 38 on housing 20, and stop and lock nuts 40 on rod 26. Rod 36 has an upper end threaded stop rod 36*a* interconnected with base 24 such as by threaded interengagement therewith and a lower end threaded stop rod 36*b* which receives nuts 40. The particular router illustrated in FIG. 1 further includes a plunge lock lever 42 which, as is well known, is adapted to releasably hold base 24 in a given position relative to housing 20 by releasably interengaging the housing 20 and one of the support and guide posts 26. Such locking of the base 24 may be desired during a bit changing or plunge depth adjusting operation.

Figure 2:
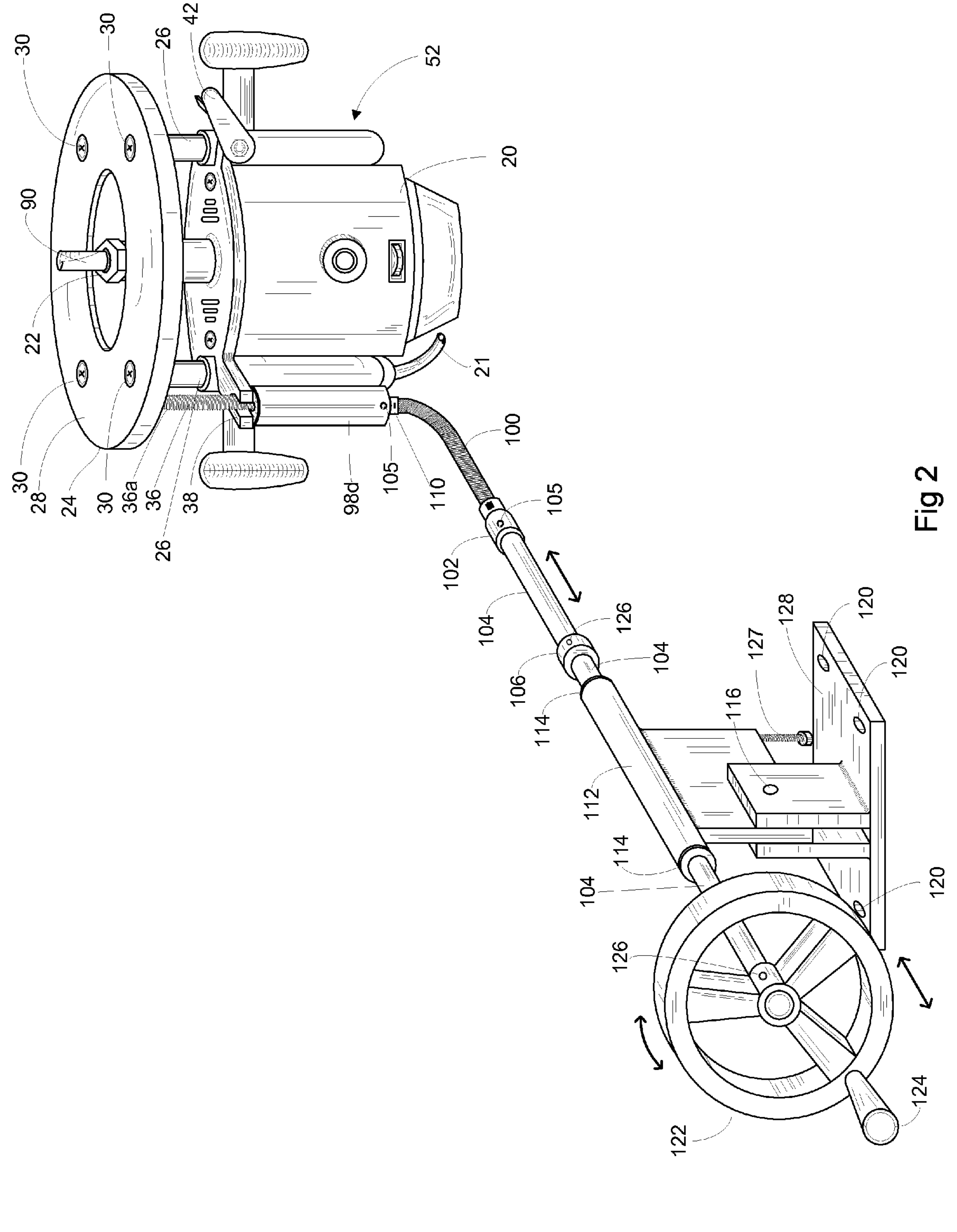
FIG. 2 is a perspective view from the side of the present embodiment as it would appear mounted to a router table.

FIG. 2 is a perspective view from the side of the present embodiment as it would appear mounted to a router table, illustrating the hand wheel handle 124 attached to hand wheel 122 being secured to driving shaft 104 with set screw 126. Driving shaft 104 axially penetrates a brass bushing 114 which is encased by rocker drive guide 112 and attached to base mount 128 and mounted to surface mounting screws 120 not shown. Connection between rocker drive guide 112 and base mount 128 is accomplished with pivot retainer pin 116. Accordingly stop collar 106 is axially secured to driving shaft 104 with set screw 126. Driving shaft 104 is then coupled to flexible extension attachment holder 100 with flexible extension coupler 102 and secured with spring pin 105. The opposing end of the flexible extension attachment holder 100 is then coupled to the attachment coupler 110 and secured to the threaded attachment 98*d* by spring pin 105. The end of the threaded attachment 98*d* engages the threaded stop rod 36. Notably the threaded attachment 98*d* is screwed onto the threaded stop rod 36. The driving shaft 104 can be in the form of a steel rod.

Figure 3:
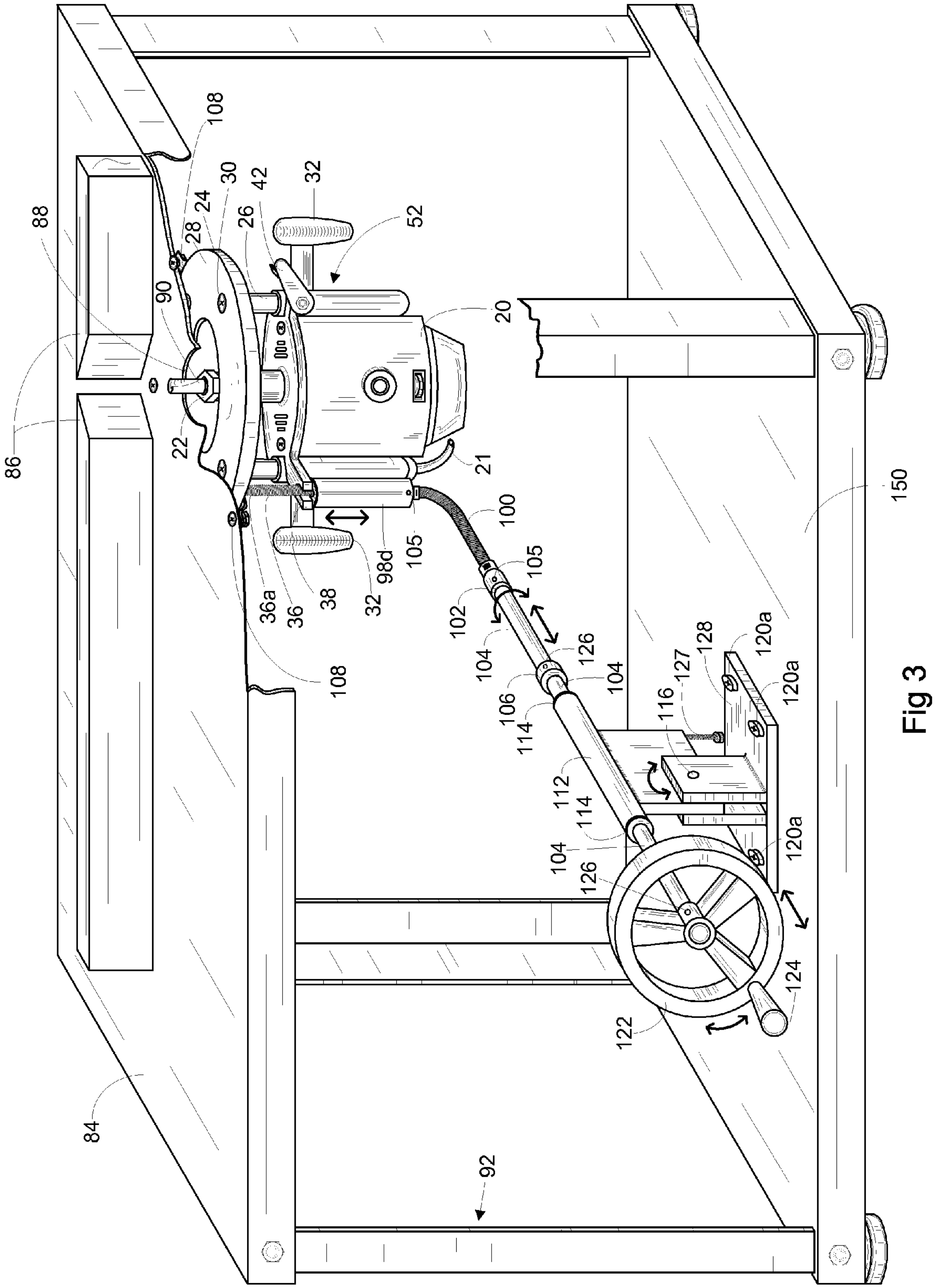
FIG. 3 is a perspective view taken from the front side of the present embodiment of FIG. 2, mounted in a router table with the router table quadrant "cut away" to appreciate mounting; and operation of embodiment.

FIG. 3 is a perspective view taken from the front side of the present embodiment of FIG. 2, mounted in a router table 92 with the router tables' front side quadrant "cut away" to appreciate mounting; and operation of embodiment. In continuation of description FIG. 2, base 24 is mounted to underside of router table top 84 and secured with router mount bracket 108 securing router to underside of table top 84. Router table opening 88 allows router bit 90 to protrude through table top. Router table fence 86 are guides for wood stock that make contact with the face of the fence and are common knowledge to the art. Note that router table fence 86 is adjustable and removable. Embodiment is secured to router table 92 on shelf 150 with mounting screws 120*a*. Notably embodiment is mountable from any side of router table 92 and view gives one example of placement of embodiment.

Figure 4:
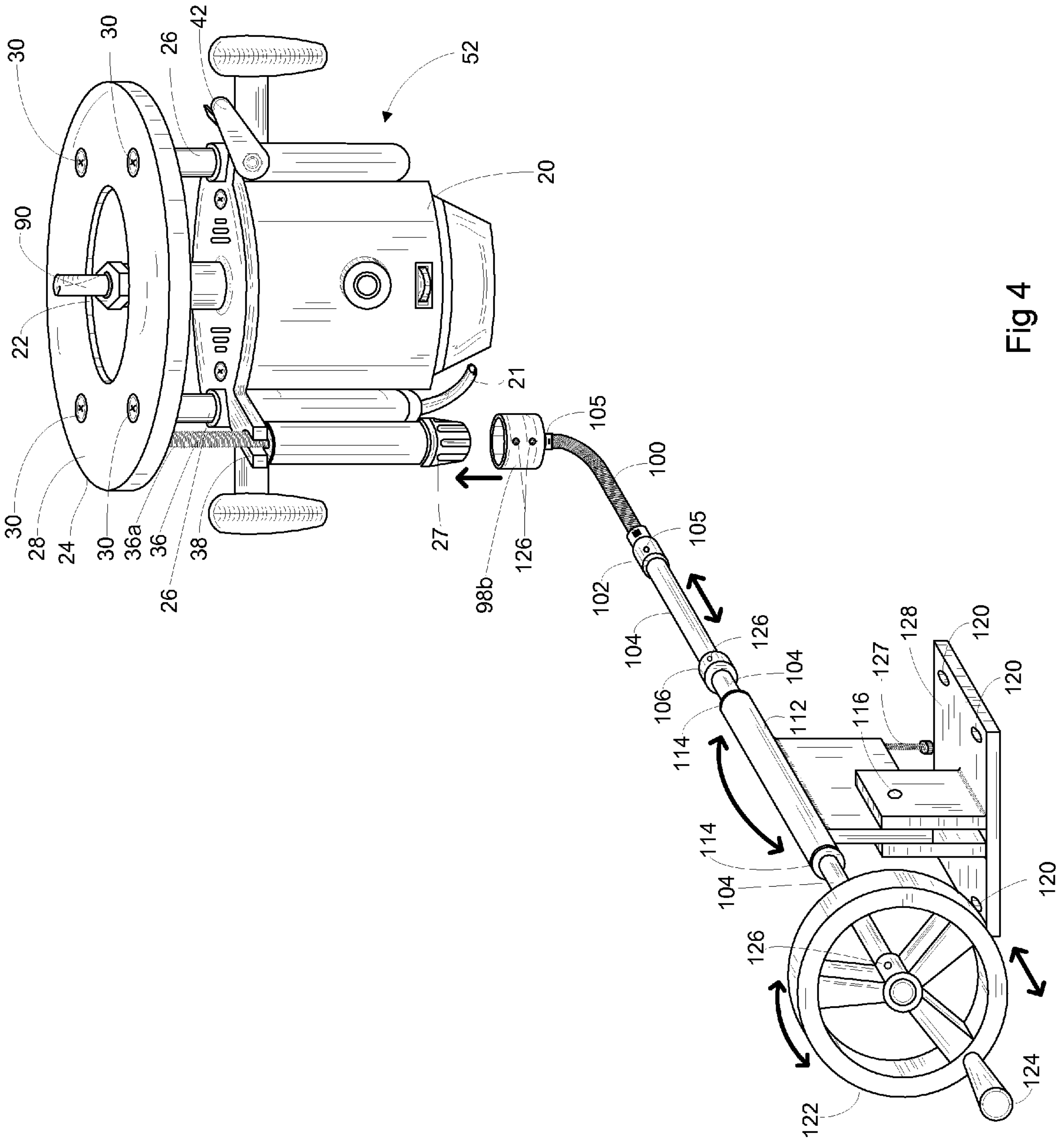
FIG. 4 is perspective views of other possible designs of the present embodiment which serve the same functionality of described embodiment.

FIG. 4 is a perspective view of a slightly modified embodiment of the present embodiment substituting a cup attachment 98*b* for routers equipped with an adjustment dial 27. An adjustment dial 27 typically functions similarly to the threaded attachment of 98*d* as shown in FIG. 1 and FIG. 2. That is, rotation of either result in adjustment of depth of the router bit 90 relative to the base 24. Router adjustment dial 27 attaches to the cup attachment 98*b* and is secured by set screws 126. Furthermore illustrating the same functionality of described embodiment.

Figure 5:
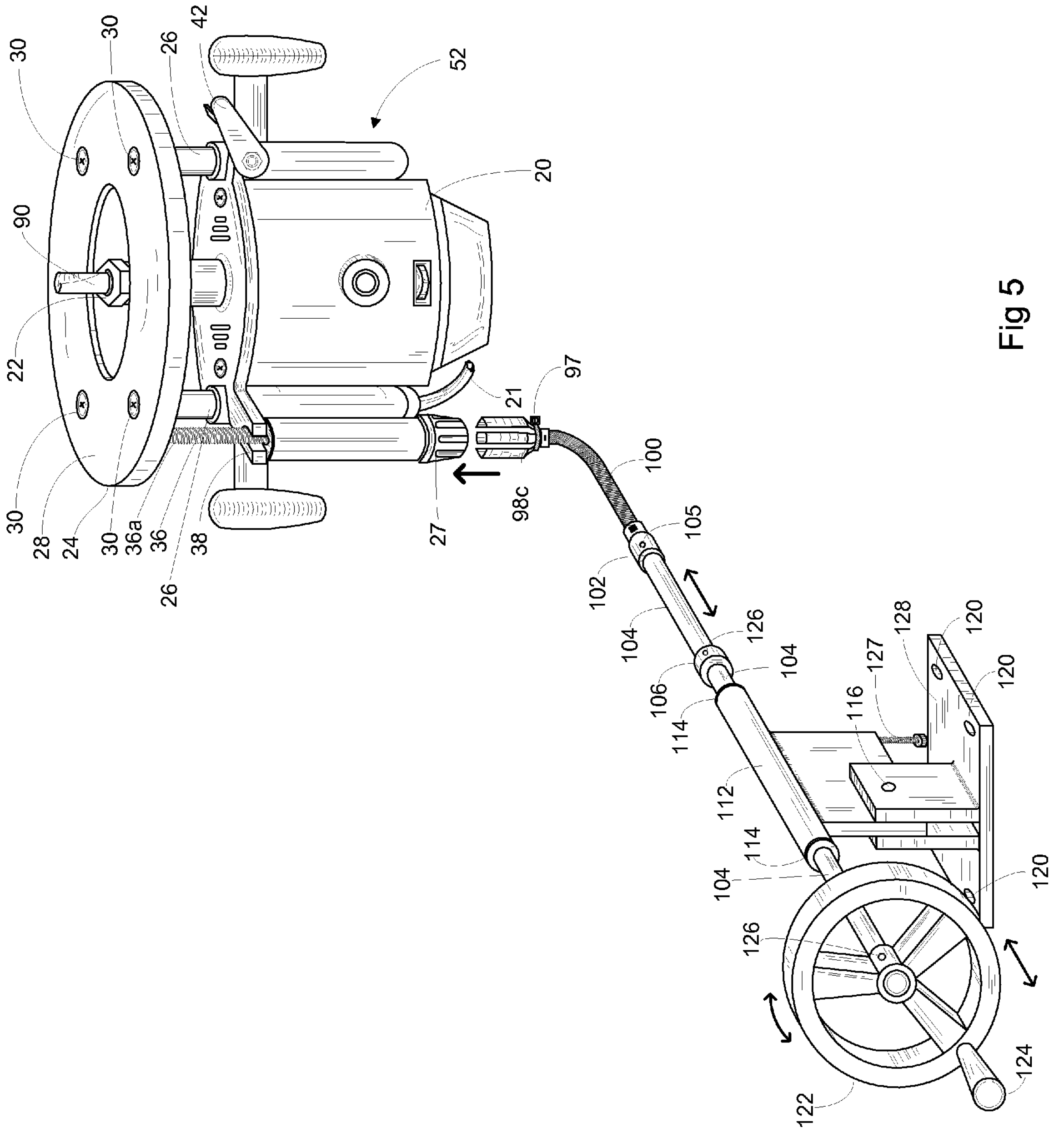
FIG. 5 is another perspective view of an embodiment from the side of the present embodiment as it would appear mounted to a router table.

FIG. 5 is a perspective view of a slightly modified version of the present embodiment substituting a crimp attachment 98*c* for a plunge router 52 equipped with an adjustment dial 27. Crimp attachment 98*c* couples to adjustment dial 27, secured by hose clamp 97. Furthermore illustrating the same functionality of described embodiment.

Figure 6:
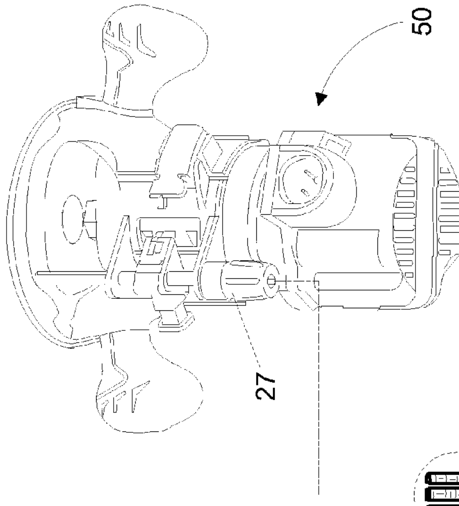
FIG. 6 is another perspective view of an embodiment from the side of the present embodiment as it would appear on a fixed base router mounted to a router table.
Figure 6:
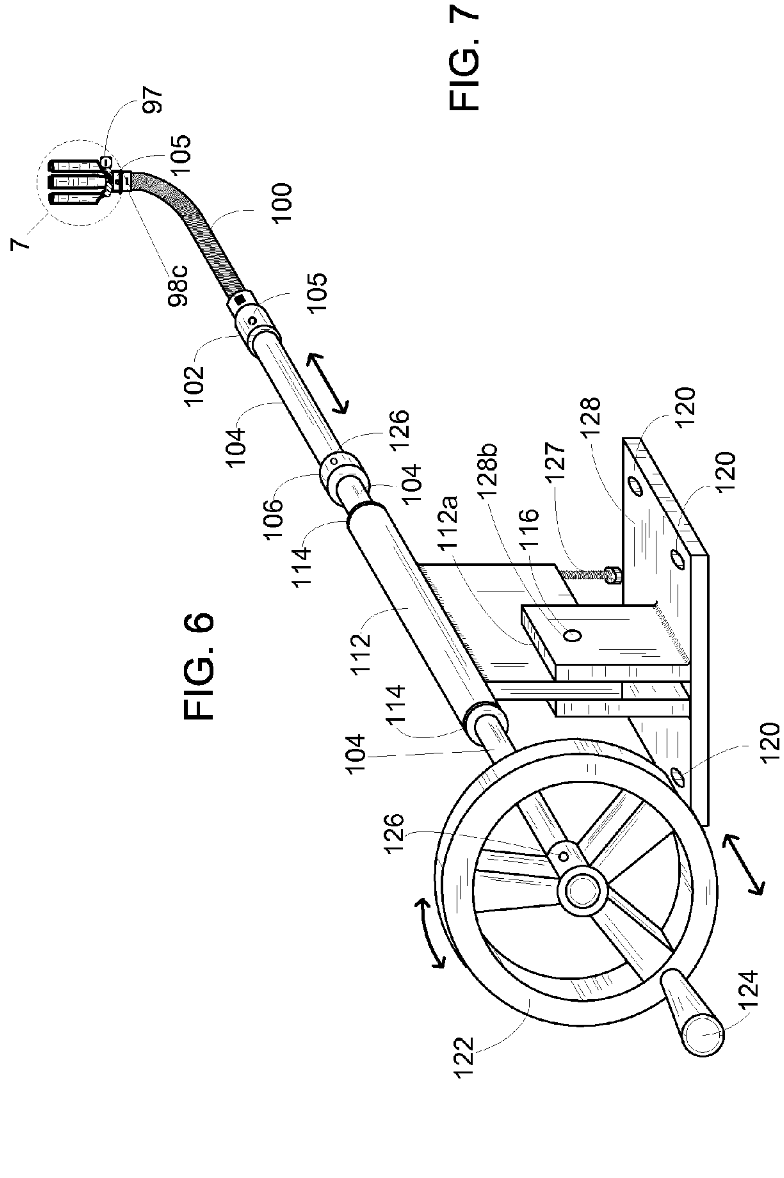

FIG. 6 is the similar perspective embodiment as FIG. 5 operationally connecting to a fixed base router 50 equipped with an adjustment dial 27. The first end crimp attachment 98*c* slips over the exposed end of adjustment dial 27 and is secured by tightening the hose clamp 97. Once secured, grasping hand wheel handle 124 and thereby rotating hand wheel 122 respectfully transfers rotational energy to the driving shaft 104, flexible extension attachment holder 100, crimp attachment 98*c* and adjustment dial 27. Set screw 126 secures hand wheel 122 to second end of driving shaft 104. Spring Pin

105 secures first end of driving shaft 104 to second end of flexible extension attachment holder 100. First end of flexible extension attachment holder 100 secures to second end of crimp attachment using spring pin 105. Rocker drive guide 112 bore is lined with bushing 114 allowing driving shaft 114 to rotate and slide to and fro within bore of bushings 114 freely. Rocker drive guide 112 attaches to base mount 128 with pivot retainer pin 116 pressed into first side of base mount pivot hole 128*b*, through rocker drive pivot hole 112*a* not visible, and flush with second end base mount pivot hole 128*b*, not visible. It should be appreciated that press fit of pivot retainer pin 116 is flush with both ends of base mount pivot hole 128*b* and rocker driver guide 112 rocker drive pivot hole 112*a* hinges freely on pivot retainer pin 116. Base mount 128 is equipped with base mount holes 120 for fastening with common screws or nut and bolt combination to a secure surface. To adjustably limit the to and fro movement of the driving shaft 104 and thereby the possibility of disengagement of the crimp attachment 98*c* from the adjustment dial 27, a stop collar 106 fastens to the driving shaft 104, secured with set screw 126. The stop collar 106 is adjustable to any unoccupied location on the driving shaft. Likewise a stop screw 127 is threaded to the underside of the rocker drive guide 112 to limit its range of pivotal motion.

Figure 7:
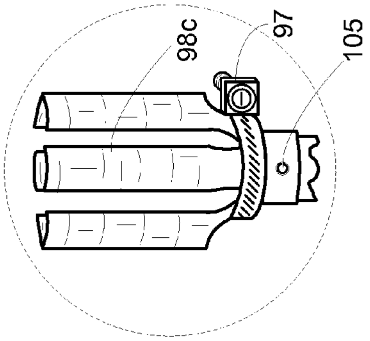
FIG. 7 is an enlarged detail of a partial view of FIG. 6

FIG. 7 is an enlarged detail of a partial view of FIG. 6 detailing the crimp attachment 98*c*. A hose clamp 97 is provided to enable adjustable gripping of the crimp attachment 98*c* to the adjustment dial 27 of FIG. 6.

Figures 8, 9:
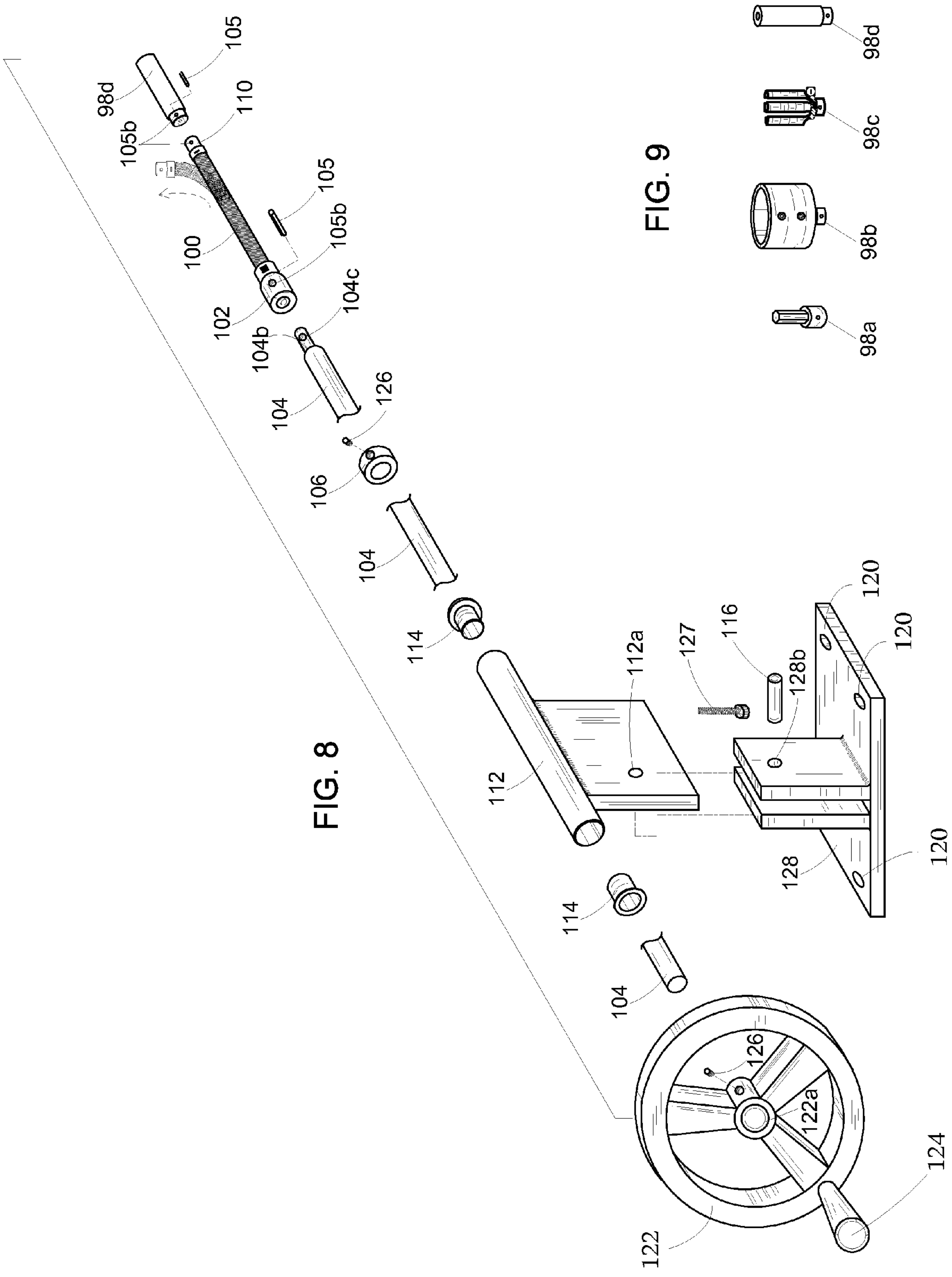
FIG. 8 is an exploded perspective view of the present embodiment.
FIG. 9 is a perspective group view of a variety of interchangeable attachments of the present embodiment.

FIG. 8 is an exploded perspective view of the present embodiment. The first end of the threaded attachment 98*d*, have threads to couple to a complementary threaded adjustment mechanism. The second end of the threaded attachment 98*d* couple to the first end of the flexible extension attachment holder 100 slipping over the attachment coupler 110 and secured with spring pin 105 pressed into spring pin hole 105*b* until flush with external surface of threaded attachment 98*d*. Similarly, second end of flexible attachment holder 110 connected to flexible extension coupler 102 slips over first end of driving shaft 104 abutting against driving shaft shoulder 104*b* and secured with spring pin 105 pressed into spring pin hole 105*b* through driving shaft hole 104*c* until flush with external surface of flexible extension coupler 102. Stop collar 106 slips over driving shaft 104 and secured with set screw 126 providing an adjustment to limit to and fro movement of the driving shaft 104. Bushings 114 press into first and second end of rocker drive guide 112. Driving shaft slides through the bore of the bushings 114 and out the second end of rocker drive guide 112 leaving sufficient exposure of second end of driving shaft to slide into hand wheel hole 122*a* and secure assemble with set screw 126. Rocker drive 112 pivotally attaches to base mount 128. Pivot retainer pin 116 presses into base mount pivot hole 128*b* through rocker drive pivot hole 112*a* and flush with other side of base mount pivot hole 128*b*, not visible. Stop screw 127 adjustably threads into bottom end of rocker drive guide 112 adjustably limiting the pivotability of rocker drive guide 112 relative to base mount 128. Base mount hole 120 provide a fastening point for mounting to a stationary surface.

FIG. 9 is a perspective group view of a variety of interchangeable attachments of the present embodiment. Furthermore displaying a sampling, but not limited to interchangeable attachments that are substitutable with threaded attachment 98*d* of FIG. 8. Different brands and models of routers have various adjusters for adjusting the height of a router bit 90 of FIG. 1. FIG. 9 provides a sampling of attachment couplers. Hex attachment 98*a* provides attachability to height adjustments having a hexagonal connector. Similarly, cup attachment 98*b* provides attachability to height adjustments having a circular connector such as adjustment dial 27 of FIG. 4. Further, crimp attachment 98*c* provides attachability to height adjustments having a more undefined geometric shape such as valve handle 154 of FIG. 12. Furthermore, threaded attachment 98*d* provides attachability to height adjustments having a threaded connector such that of threaded attachment 98*d* of FIG. 2.

Figure 10:
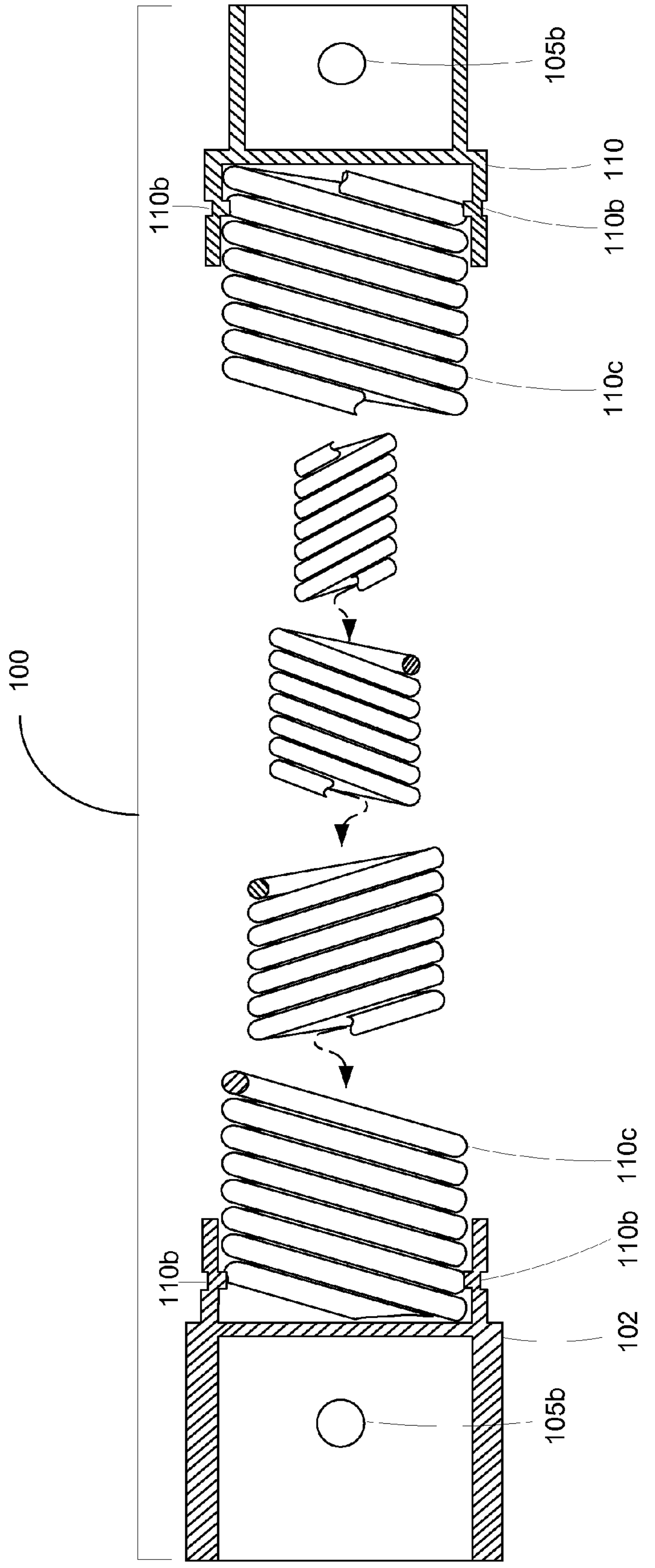
FIG. 10 is an exploded, partial cross sectional side view of the flexible extension attachment holder 100 of FIG. 8.

FIG. 10 is an exploded partial cross sectional side view of the flexible extension attachment holder 100 of FIG. 8, detailing the outer spiral wound shaft enclosing succeedingly smaller diameter spiral wound shafts wound counter directionally to preceding enclosing spiral shaft. Material is of sufficient wire spring quality to allow optimal multidirectional flexibility. This embodiment utilizing a slightly modified flexible extension bit holder commonly used by mechanics to access a fastener in an inconvenient location. Further, flexible extension attachment holder 100 having a crimp 110*b* on each end of flexible extension coupler 102 such that having sufficiently contact against spiral spring 110*c* to form a unified assembly. Furthermore, flexible extension attachment holder 100 having spring pin holes 105*b* on opposing ends of flexible extension attachment holder 100 to spring pin 105 of FIG. 8.

Figure 11:
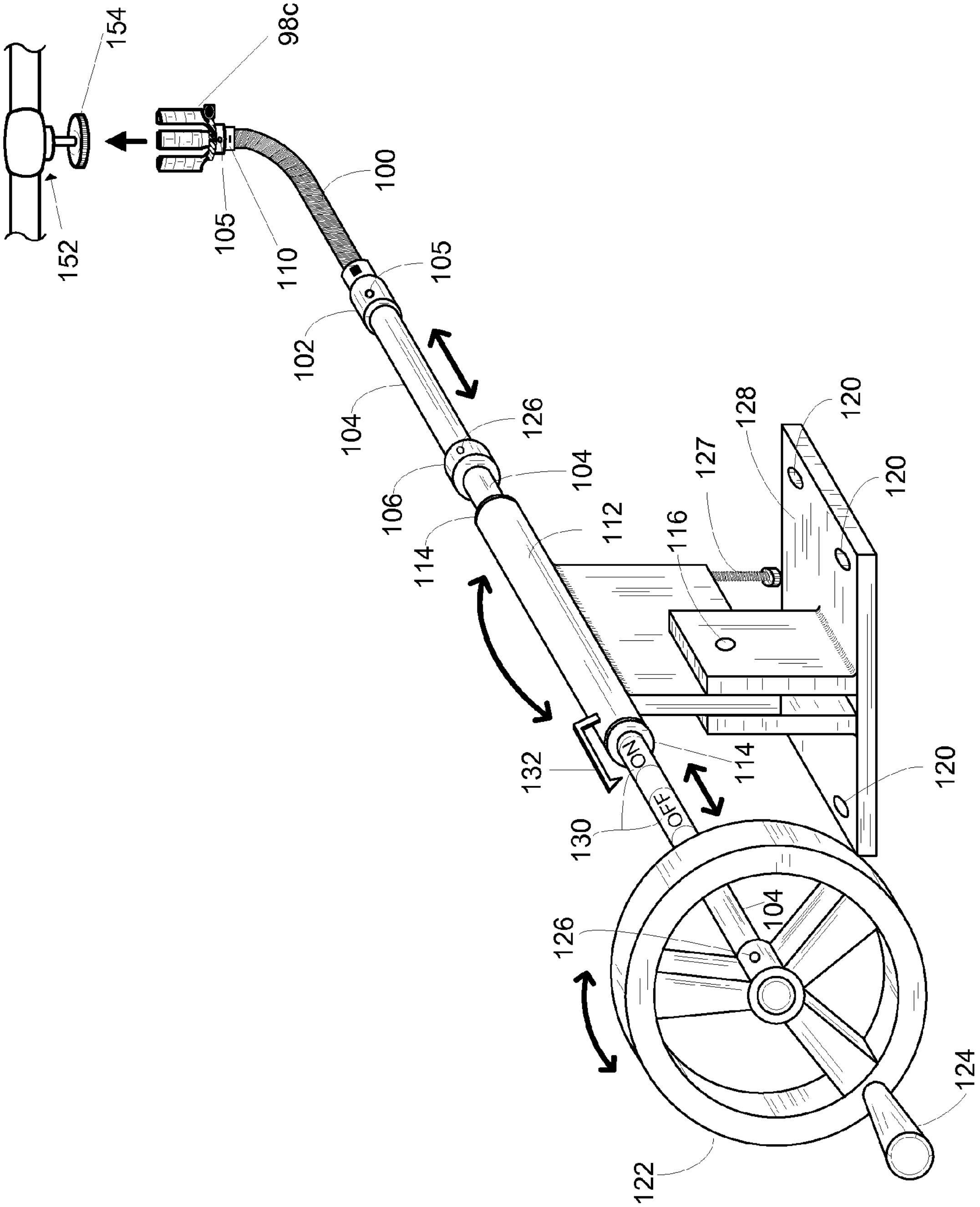
FIG. 11 is another perspective embodiment engaging a valve handle 154.

FIG. 11 is a perspective view of the present embodiment displaying the crimp attachment 98*c* connecting to a valve handle 154 of a valve 152 and having an indicia 130 and a pointer 132 to indicate position valve handle 154 is in relative to being turned on or turned off. It should be appreciated that the valve handle 154 commonly moves spirally up or down depending on the direction of rotation. Rotational movement of the hand wheel 122, driving shaft 104, flexible extension attachment holder 100, and crimp attachment 98*c* assembly engages the valve handle 154 providing the ability to regulate the flow within the valve 152. The spiraling up or down movement of the valve handle 154 during rotation results in the flexible extension attachment holder 105 bending as it twists accordingly, moving the attached driving shaft 104 sliding and rotating within the bushing 114 of the rocker drive guide 112 changing thereof. The resulting sliding motion of the driving shaft 104 within the rocker drive guide 112 forces the rocker drive guide 112 to pivot on the pivot retainer pin 116 relative to the base mount 128. The pivoting movement of the rocker drive guide 112 as the driving shaft 114 assembly rotates, results in a spiral movement of the hand wheel 122, driving shaft 194, flexible extension holder 100, and crimp attachment 98*c* assembly moving to and fro within the encompassing rocker drive guide 112 resulting in the change in the position of the pointer 132 relative to the indicia 130.

Figure 12:
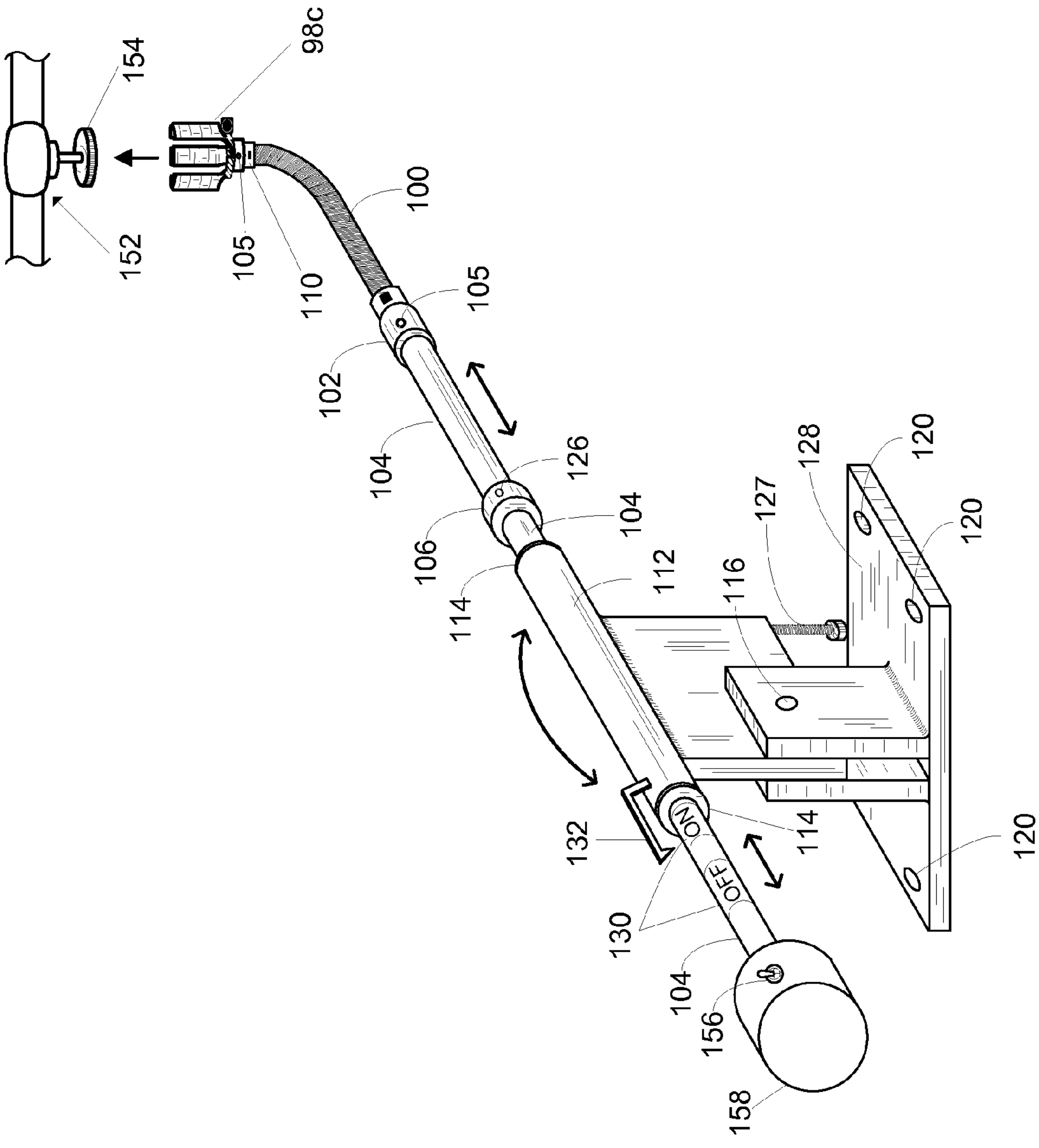
FIG. 12 is the same perspective embodiment as FIG. 11 substituting a motor 158 for the hand wheel 122 of FIG. 11.

FIG. 12 is the same perspective embodiment as FIG. 11 substituting a motor 158 for the hand wheel 122 of FIG. 11. The motor 158 would advantageously allow the operator of the embodiment to effortlessly rotate the driving shaft 104 under electrical power. Power may be provided through a standard electrical cord, a rechargeable battery embedded in the motor assembly, and the like without departing from the scope and sprit of the present invention. A toggle switch 156 is provided to allow reversing the direction of motor 158. The operator of the embodiment would grasp the motor 158 insuring positive transfer of rotational energy to the driving shaft 104 and subsequent interrelated parts.

Operation

In operation (FIGS. 1, 2 and 3), one uses the rocker slide lift adjustment mechanism to raise and lower a router bit 90 relative to a router table top 84 (FIG. 3). The router bit 90 is mounted in a bit chuck 22 of a router 52, mounted under a router table top 84. When installing the embodiment, the user mounts the embodiments' base mount 128 to a surface such as a router table shelf 150 securing the base mount 128 to the router table 92 with mounting screws 120*a*. Furthermore replacing the lock nuts 40 (FIG. 1) with threaded attachment 98*d* (FIG. 3). The threaded attachment 98*d* end contacts the abutment member 38. Once mounted, raising the router bit 90 relative to the router table top 84 proceeds as follows:

1) The woodworker grasps the hand wheel handle 124 and rotates handle clockwise causing the interconnected assembly of components; hand wheel 122, driving shaft 104, stop collar 106, flexible extension coupler 102, flexible extension attachment holder 100, threaded attachment 98*d* to rotate clockwise in unison.
2) This rotation causes the threaded attachment 98*d* to engage the threaded stop rods' 36 threads, pushing against the abutment member 38. This movement guided by the support guide rods 26 of the router causes the housing 20 to approach the base 24 of the router.
3) Since the sub-base component 28 of the router is secured to the underside of the router table top 84 with the router mount brackets 108; movement upward of the router housing 20 causes the bit chuck 22 which secures the router bit 90 to protrude further upward through the router table opening 88.
4) Once the proper depth of the router bit 90 exposure is set above the router table top 84, the user then guides the material; usually wood to be routed across the top of the table top 84 into the router bit 90; optionally guided by the router table fence 86. The router bit 90 cuts the material to the depth of the router bit 90.
5) When less protrusion of the router bit 90 is desired relative to the table top 84, rotating the hand wheel 122 counter-clockwise causes the bit to retract through the table opening 88.

When adjusting the routers' depth, the flexible extension attachment holder 100 will bend to different angles relative to the base 24. The bending causes the interconnected driving shaft 104 to change its angle too. To adjust for the change in angle, as the interconnected parts are rotated, the rocker drive guide 112 allows the driving shaft 104 to slide to and fro within the bushing 114 while also allowing the driving shaft 104 to rotate within the rocker drive guide bushing 114. Additionally, the rocker drive guide 112 can pivot on the pivot retainer pin 116 (much like a teeter-totter). The pivot retainer pin 116 couples the base mount 128 and rocker drive guide 112 together. This rotating, pivoting and sliding action prevents any binding of the driving shaft 104 while adjustments are being made.

To prevent the threaded attachment 98*d* from disengaging from the threaded stop rod 36, a stop collar 106 is provided. The stop collar 106 is secured to the driving shaft 104 with a set screw 126. The stop collar is adjusted to contact the nearest end of the rocker drive guide 112, just before the threaded tube 96 attachment 98*d* disengages the threaded stop rod 36.

While the embodiment is illustrated and described herein in connection with a Hitachi Model M12V plunge router 52, the embodiment is applicable to many other plunge routers and fixed based routers including, for example, and without excluding others, routers marketed by Porter Cable, Makita, Sears Craftsman, Black & Decker, Ridgid, Freud, and DeWalt. These and other modifications of the embodiment disclosed herein as well as other embodiments will be obvious or suggested to those skilled in the art from the disclosure herein, whereby the foregoing descriptive matter is to be interpreted merely as illustrative of the present embodiment and not as a limitation.

I claim:

1. A rocker slide lift for adjusting the depth of a router bit by rotating a rotatable adjustment mechanism comprising:

(a) an attachment having a first end and a second end, said first end of said attachment having means for coupling to said rotatable adjustment mechanism, (b) a flexible extension attachment holder having a first end and a second end, said first end of said flexible extension attachment holder having means for coupling to said second end of said attachment, (c) a driving shaft having a first end and a second end, said first end of said driving shaft having means for coupling to said second end of said flexible extension attachment holder, (d) a rotational energy source having means for coupling to said second end of said driving shaft thereon, (e) a rocker drive guide having a bottom side and a bore extending through a first end thereof and out a second end thereof; said bore encircling said driving shaft therein;

(f) a base mount having a top side and a bottom side, said top side of said base mount having means to couple to said bottom side of said rocker drive guide, said bottom side of said base mount having means to mount the base mount to a surface so as to be stationary;

whereby upon urging of said rotational energy source, thereby rotational energy is transferred to rotate said driving shaft, slidably retained within said bore of said rocker drive guide, to rotate said flexible extension attachment holder, to rotate said attachment, to rotate said rotatable adjustment mechanism respectively, thereby displacing the depth of said router bit.

2. The rocker slide lift in accordance of claim 1, wherein said rocker drive guide has means to allow the driving shaft to slide to and fro and rotate within said rocker drive guide's bore upon the urging of said rotational energy source.

3. The rocker slide lift in accordance of claim 1, wherein the means to couple the top side of the base mount to the bottom side of the rocker drive guide includes means to couple hingeably to said bottom side of said rocker drive guide.

4. The rocker slide lift in accordance of claim 1, wherein an amount of said second end of said driving shaft extends from said rocker drive guide, leaving a length of said second end of said driving shaft exposed, the means for coupling the rotational energy source to said second end of said driving shaft being located on a portion of the extended amount of the driving shaft.

5. The rocker slide lift in accordance of claim 4, wherein said rotational energy source includes a hand wheel coupled to said second end of said driving shaft.

6. The rocker slide lift in accordance of claim 1, wherein said bottom side, near said first end of said rocker drive guide thereof, further includes a stop screw threaded therein for adjustably limiting hingeability of said rocker drive guide.

7. The rocker slide lift in accordance of claim 1, wherein a bore of a stop collar adjustably encircles said driving shaft thereon, between said first end of said rocker drive guide and said first end of said driving shaft, thereby limiting to and fro movement of said driving shaft.

8. The rocker slide lift in accordance of claim 1, wherein said driving shaft comprises a steel rod.

9. The rocker slide lift in accordance of claim 1, wherein said means to couple said top side of said base mount to said bottom side of said rocker drive guide includes a pivot retainer pin to hingeably secure said rocker drive guide to said top side of said base mount.

10. The rocker slide lift in accordance of claim 1, wherein said driving shaft further includes indicia.

11. The rocker slide lift in accordance of claim 10, wherein said rocker drive guide further includes a pointer pointing to said indicia.

12. The rocker slide lift in accordance of claim 11, wherein movement of said driving shaft within said rocker drive guide changes the location of said pointer relative to said indicia.

13. The rocker slide lift in accordance of claim 11, wherein said attachment is selected from one of a hex attachment, a cup attachment, a crimp attachment, or a threaded attachment to facilitate use with a variety of said rotatable adjustment mechanisms.

14. The rocker slide lift in accordance of claim 1 wherein said rotatable adjustment mechanism includes a threaded stop rod and an adjustment dial on a router.

15. An apparatus for adjusting the depth of a router bit by rotating a rotatable adjustment mechanism comprising:

(a) an attachment having a first end and a second end, said first end of said attachment having a shape for coupling to said rotatable adjustment mechanism, (b) a flexible extension attachment holder having a first end and a second end, said first end of said flexible extension attachment holder coupled to said second end of said attachment, (c) a driving shaft having a first end and a second end, said first end of said driving shaft coupled to said second end of said flexible extension attachment holder, (d) a rotational energy source coupled to said second end of said driving shaft thereon, (e) a rocker drive guide having a bottom side and a bore extending through a first end and out a second end of said rocker drive guide; said bore encircling said driving shaft therein such that the driving shaft is slideable and rotatable therein;

(f) a base mount having a top side and a bottom side; said top side of said base mount hingeably coupled to said bottom side of said rocker drive guide; said bottom side of said base mount mounted stationary to a surface;

wherein said rotational energy source is coupled to rotate said driving shaft, which is coupled to rotate said flexible extension attachment holder, which is coupled to rotate said attachment, and said rocker drive guide is pivotably hinged to said base mount via the hingeable coupling.

16. An apparatus for adjusting the depth of a router bit as set forth in claim 15, wherein said attachment is selected from one of a hex attachment, a cup attachment, a crimp attachment, or a threaded attachment to facilitate use with a variety of shapes of said rotatable adjustment mechanism.

* * * * *